United States Patent [19]

Ishizaka

[11] Patent Number: 4,629,336

[45] Date of Patent: * Dec. 16, 1986

[54] ELECTRONIC CLINICAL THERMOMETER, AND METHOD OF MEASURING BODY TEMPERATURE

[75] Inventor: Hideo Ishizaka, Fujinomiya, Japan

[73] Assignee: Terumo Corp., Tokyo, Japan

[*] Notice: The portion of the term of this patent subsequent to Sep. 17, 2002 has been disclaimed.

[21] Appl. No.: 748,663

[22] Filed: Jun. 24, 1985

Related U.S. Application Data

[63] Continuation of Ser. No. 504,236, Jun. 14, 1983, Pat. No. 4,541,734.

[30] Foreign Application Priority Data

Jun. 24, 1982 [JP] Japan ............................. 57-108893
Jun. 24, 1982 [JP] Japan ............................. 57-108894

[51] Int. Cl.⁴ ........................ G01K 7/00; G01K 7/24
[52] U.S. Cl. .................................. 374/169; 374/172; 364/557; 128/736
[58] Field of Search ............. 374/169, 172; 364/557; 128/736

[56] References Cited

U.S. PATENT DOCUMENTS

| | | | |
|---|---|---|---|
| 3,702,076 | 11/1972 | Georgi | 374/169 |
| 3,877,307 | 4/1975 | Georgi | 374/169 |
| 3,942,123 | 3/1976 | Georgi | 374/169 |
| 4,092,863 | 6/1978 | Turner | 374/169 |
| 4,541,734 | 9/1985 | Ishizaka | 374/169 |

FOREIGN PATENT DOCUMENTS

| | | | |
|---|---|---|---|
| 0039460 | 4/1981 | European Pat. Off. | 374/169 |
| 52-75385 | 6/1977 | Japan | 374/169 |
| 125423 | 9/1980 | Japan | 374/169 |
| 58-33133 | 2/1983 | Japan | 374/169 |
| 2084329 | 4/1982 | United Kingdom | 374/169 |

OTHER PUBLICATIONS

ELECTRONIC LETTERS, vol. 9, No. 8/9, 3 mai 1973, pp. 184–186, Hitchin, Herts, G.B.; B. Bramer et al.: "Fitting of Measured Data to a Known Relationship", *p. 184, colonne de droite–p. 185, colonne de gauche.

Primary Examiner—Charles Frankfort
Assistant Examiner—Thomas B. Will
Attorney, Agent, or Firm—Frishauf, Holtz, Goodman & Woodward

[57] ABSTRACT

An electronic clinical thermometer capable of executing plural temperature prediction functions in which elapsed measurement time is a variable, each function prescribing a temperature change up to a final, stable temperature. One of the temperature prediction functions is set, and actual body temperature is sensed at a specific point in time. Then, based on the sensed temperature and selected function, a final temperature is obtained at least twice in accordance with a time series and the temperatures are compared to obtain a difference between them. When the difference falls outside prescribed limits, a new temperature prediction function is selected, a final temperature is obtained based thereon, and the foregoing process is repeated until a difference is found which lies within the prescribed limits. The final temperature obtained at such time is delivered as an output indicative of measured temperature.

20 Claims, 14 Drawing Figures

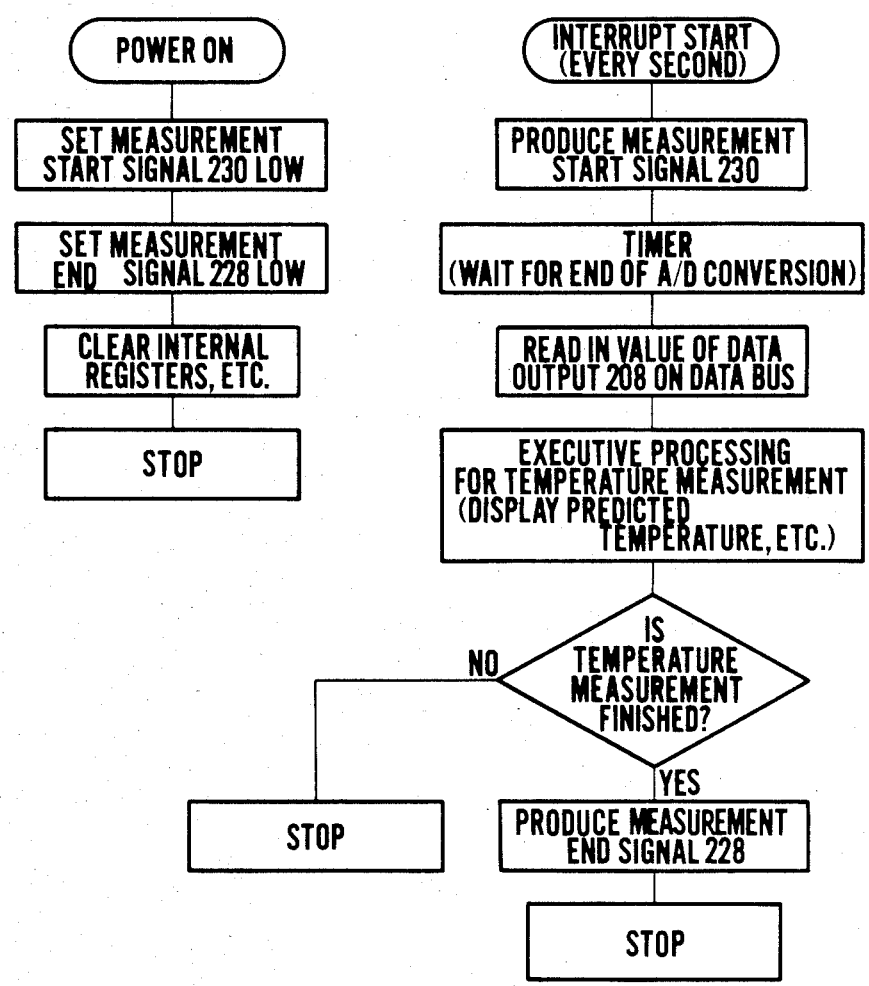

ELECTRONIC CLINICAL THERMOMETER, AND METHOD OF MEASURING BODY TEMPERATURE

This is a continuation, application Ser. No. 504,236 filed June 14, 1983 now U.S. Pat. No. 4,541,734.

BACKGROUND OF THE INVENTION

1. Field of the Invention

This invention relates to an electronic clinical thermometer and, more particuarly, to an electronic clinical thermometer which includes means for sensing the temperature of a portion of the human body, arithmetic means for predicting, based on the sensed body temperature, the final temperature at which the thermometer will stabilize, and means for displaying temperature. The invention further relates to a method of measuring body temperature.

2. Description of the Prior Art

In the prior art arrangement, the temperature which will prevail upon thermal stabilization of the electronic clinical thermometer is predicted from measured temperature and is displayed before thermal stabilization is attained. Typically, prediction of temperature is performed by monitoring, over a period of time, the measured temperature as well as the rate of change thereof with time, and employing these two variables along with a function for predicting temperature in which the variable is the elapsed time up to the moment of observation. The predicted final, stable temperature is uniquely defined by the actual values of these three variables.

With an electronic clinical thermometer that operates by predicting the final, stable temperature, measurement of temperature is completed before thermal stabilization is attained, thereby reducing the time required for measurement. However, a disadvantage with such a thermometer is that the accuracy with which temperature is predicted declines markedly unless a proper temperature prediction function is chosen.

Ordinarily, the temperature prediction function has a temperature rise curve the shape whereof differs depending upon the portion of the body being measured, such as the region under the armpit or the interior of the mouth. The conventional electronic clinical thermometer possesses only a single temperature prediction function for measuring body temperature orally or by placement in the armpit. An electronic clinical thermometer having both of these functions for measurement of both regions is not available. Another disadvantage with the conventional electronic clinical thermometer is that the predicted value of the final, stable temperature is displayed, and the value retained, after the elapse of a predetermined period of time or when a prescribed rate of change of temperature has been observed. The accuracy of the temperature prediction is decided by this display and retention of the predicted value. Accordingly, there is insufficient freedom to effect any improvement in temperature prediction which might be required. It is desired, therefore, that a final temperature, reached upon stabilization, be computed with greater accuracy by continuing measurement, even after a final temperature has been predicted and displayed, rather than suspending measurement and anticipatory computations at such time.

SUMMARY OF THE INVENTION

Accordingly, an object of the present invention is to provide an electronic clinical thermometer, and a method of measuring body temperature, for predicting a final, stable temperature with great accuracy.

Another object of the present invention is to provide an electronic clinical thermometer, and a method of measuring body temperature, for predicting a final, stable temperature conforming to the particular portion of the body where the body temperature is being measured.

Another object of the present invention is to provide an electronic clinical thermometer, and a method of measuring body temperature, for improving the accuracy of temperature prediction statistically with the passage of measurement time.

According to the present invention, the foregoing objects are attained by providing an electronic clinical thermometer comprising temperature sensing means, arithmetic means having a store of plural temperature prediction functions in which elapsed measurement time is a variable, each function prescribing a temperature change up to a final, stable temperature, and control means which clocks elapsed measurement time for controlling the temperature sensing means and the arithmetic means at sampling instants. The arithmetic means is operative for (a) selecting one of the plurality of temperature prediction functions, (b) obtaining a final, stable temperature at least twice in accordance with a time series, at sampling instants decided by the control means, based on the selected temperature prediction function and body temperature sensed by the temperature sensing means, (c) comparing a final, stable temperature obtained in (b) and a final, stable temperature obtained at a previous sampling instant, for obtaining the difference between the two temperatures, (d) selecting a new temperature prediction function from the plurality of temperature prediction functions, and returning to (b), when the difference falls outside prescribed limits, and (e) supplying display means with a signal indicative of a final, stable temperature obtained in (b) when the difference falls within the prescribed limits.

According to an embodiment of the invention, the arithmetic means, in performing (b), computes a corrective temperature differential, at the sampling instants, between body temperature sensed by the temperature sensing means and a predicted value of a final, stable temperature, the differential being computed from the selected temperature prediction function, and obtains the final, stable temperature by adding the calculated corrective temperature differential to the sensed body temperature at the sampling instants. Further, $U = \gamma t + \beta + K(t+\gamma)^\delta$ is used as the temperature prediction function, where:

U: corrective temperature differential
t: elapsed measurement time
K: variable parameter indicating extent of temperature rise
$\gamma, \beta, \gamma, \delta$: constants.

In another embodiment of the invention, $U = (aA+b)t + cA + d + K(t+e)^A + f(t-t_o)/(K+g)$ is used as the temperature prediction function, where:

U: corrective temperature differential
t: elapsed measurement time
A: variable parameter dependent upon part of body where temperature is being sensed K: variable parameter indicating extent of temperature rise a, b, c, d, e, f, g: constants $t_o$: constant indicating prescribed point in time during course of measurement $(t-t_o)$ being replaced by zero when $t-t_o$ is negative, and by the actual value when $t-t_o$ is non-negative.

The arithmetic means supplies the display means with a predicted value of the obtained final, stable temperature when the difference lies within the prescribed limits continously a predetermined length of time, and returns to (b) when the difference does not lie in the prescribed limits continuously for the predetermined length of time. The temperature prediction function selected in (a) can be an average of temperature rise with elapsed measurement time. In another embodiment, the temperature prediction function selected in (a) approaches a final, stable temperature early during elapsed measurement time. In (d), temperature prediction functions approaching a final, stable temperature gradually with elapsed measurement time are selected successively.

In still another embodiment, a plurality of temperature prediction functions are provided in conformance with measurement conditions for prescribed parts of a body ranging from an armpit to the interior of the mouth, and the temperature prediction function selected in (a) corresponds to measurement conditions between those for an armpit and those for the interior of the mouth.

The control means instructs the arithmetic means to begin executing (b) through (d) when the temperature sensing means senses a body temperature above a predetermined value and the sensed body temperature exhibits a rate of increase above a predetermined value.

In another aspect of the invention, there is provided an electronic clinical thermometer comprising temperature sensing means, arithmetic means having a store of plural temperature prediction functions in which elapsed measurement time is a variable, each function prescribing a temperature change up to a final, stable temperature, and control means which clocks elapsed measurement time for controlling the temperature sensing means and the arithmetic means at sampling instants. In this aspect of the invention, the arithmetic means is operative for (a) selecting one of the plurality of temperature prediction functions, (b) obtaining a final, stable temperature at least twice in accordance with a time series, at sampling instants decided by the control means, based on the selected temperature prediction function and body temperature sensed by the temperature sensing means, (c) comparing a final, stable temperature obtained in (b) and a final, stable temperature obtained at a previous sampling instant, for obtaining the difference between the two temperatures, (d) selecting a new temperature prediction function from the plurality of temperature prediction functions, and returning to (b) when the difference falls outside prescribed limits, and (e) supplying the display means with a signal indicative of a final, stable temperature obtained in (b) when the difference falls within the prescribed limits, and returning to (b).

In a preferred embodiment, the display means is supplied with a predicted value of the obtained final, stable temperature, and a return is effected to (b) when the difference lies within the prescribed limits continously a predetermined length of time, and a return is effected to (b) when the difference does not lie in the prescribed limits continuously for the predetermined length of time.

In still another aspect of the present invention, there is provided a method of measuring body temperature including steps of selecting one of a plurality of temperature prediction functions in which elapsed measurement time is a variable, each function prescribing a temperature change up to a final, stable temperature; clocking elapsed measurement time and reading in body temperature at a specific point in time; predicting a final, stable temperature by repeating, at least twice in accordance with a time series, a process for obtaining a stable, final temperature based on the read body temperature and the temperature prediction function at said point in time; comparing final, stable temperature at two points in said time series to determine a difference between the temperatures; altering the temperature prediction function by selecting another temperature prediction function when the difference falls outside prescribed limits, and executing the steps from the predicting step onward; and outputting the final, stable temperature as a measured temperature when the difference falls within the prescribed limits.

The object of the invention may also be attained by providing a method of measuring body temperature comprising the steps of selecting a temperature prediction function in which elapsed measurement time is a variable, the function prescribing a temperature change up to a final, stable temperature; clocking elapsed measurement time and reading in body temperature at a specific point in time; predicting a final, stable temperature by repeating, at least twice in accordance with a time series, a process for obtaining a stable, final temperature based on the read body temperature and the temperature prediction function at said point in time; comparing the final, stable temperature at two points in the time series to determine a difference between the temperatures; altering the temperature prediction function by selecting another temperature prediction function when the difference falls outside prescribed limits, and executing the steps from the predicting step onward; and outputting the final, stable temperature as a measured temperature, and returning to the predicting step, when the difference falls within the prescribed limits.

In a preferred embodiment of the invention, predicted final, stable temperatures obtained in a time series are compared and, when the difference between each of said predicted final, stable temperatures and the next is within prescribed limits a plurality of times consecutively, a presently prevailing predicted final, stable temperature is delivered as measured temperature.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 13A, 13B are flowcharts indicating CPU operation and control when power is introduced to a microcomputer shown in FIG. 9.

DETAILED DESCRIPTION OF THE PREFERRED EMBODIMENT

Figures 1, 2:
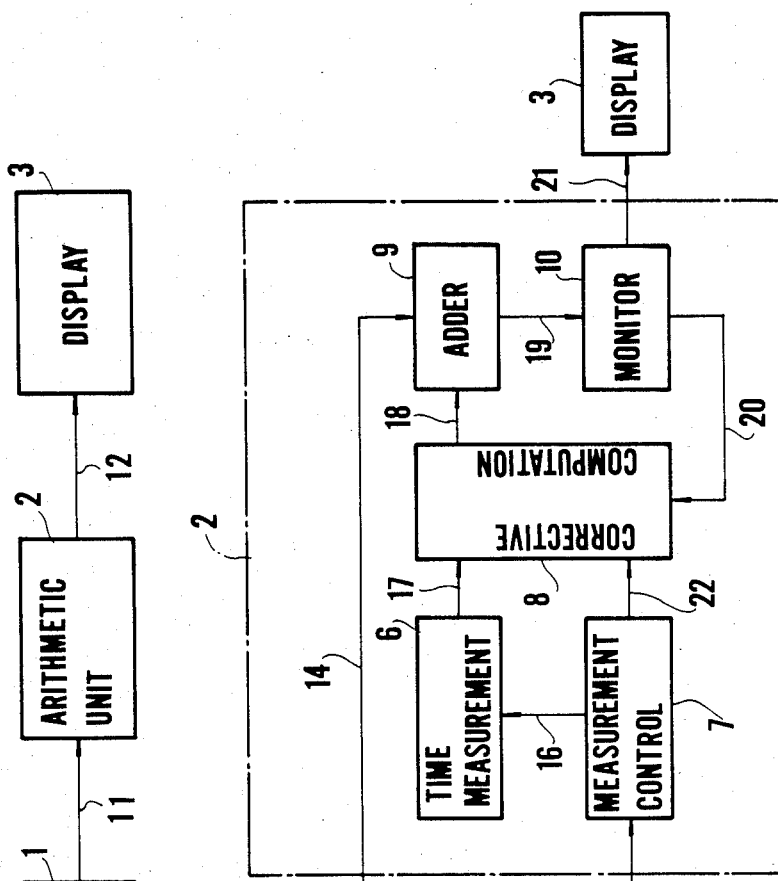
FIG. 1 is a block diagram illustrating the basic construction of an electronic clinical thermometer according to the present invention.
FIG. 2 is a block diagram illustrating, in some detail, the construction of the electronic clinical thermometer of FIG. 1 according to an embodiment of the present invention.

Reference will now be had to the block diagram of FIG. 1 showing the basic construction of an electronic clinical thermometer according to the present invention. The electronic clinical thermometer includes a temperature measuring unit 1, an arithmetic unit 2 for predicting final temperature which will be attained upon thermal stabilization of the thermometer, and a display unit 3 for displaying the temperature resulting from the arithmetic prediction operation.

The temperature measuring unit 1 is constituted by circuitry, having a temperature responsive element 4 (FIG. 2) such as a thermister, for real-time temperature measurement of a portion of the human body. The arithmetic unit 2 is composed of circuitry which predicts the final, stable temperature substantially continuously. Specifically, the arithmetic unit 2 operates by monitoring, substantially continuously, a signal 11 produced by the temperature measuring unit 1, determining conditions for starting prediction on the basis of temperature and elapsed time, initiating the prediction operation, subsequently predicting the final, stable temperature constantly at short time intervals using the latest information, such as a time signal obtained from an internally provided elapsed time measurement function, in addition to the signal 11 continuously provided by the temperature measurement unit 1, and delivering a resulting prediction signal 12 to the display unit 3 substantially continuously until the thermometer temperature stabilizes. The display unit 3 provides a visual indication of the predicted final temperature.

In general, the accuracy with which a final temperature is predicted when measuring body or other temperatures is a function of time t which has elapsed from the start of measurement, and of a differential U* between the temperature prevailing when the prediction is made and the temperature which will prevail upon stabilization. The longer the time period t, and the smaller the differential U*, the higher will be the accuracy of the prediction made.

In measuring body temperature, the clinically required accuracy of measurement differs depending upon the particular purpose. For example, a comparatively high degree of accuracy is required for determining a slight fever in treatment of tuberculosis, and for measuring basic body temperature in the field of gynecology. There are also cases, as in treatment of infections, where mere determination of high temperature is sufficient. A measurement accuracy of within ±0.2° C. is acceptable for typical measurements of body temperature. In any case, the fact is that a clinical thermometer must have a measurement accuracy commensurate with the purpose for which it is used. To obtain an accurate temperature reading with clinical thermometers that are not designed to predict final temperature, approximately ten minutes is required for armpit measurement and five minutes for measurement orally, regardless of how small the thermal capacity of the thermometer. These lengths of time, which are required for the temperature to stabilize, are similar to those experienced with a glass bulb clinical thermometer. The reason for these different measurement times is that the period of time needed to attain a stable temperature is decided more by the temperature stabilization conditions prevailing at the region being measured (i.e., the armpit or mouth) than by the thermal capacity or thermal transfer characteristics of the clinical thermometer.

Accordingly, while the advantage of the electronic clinical thermometer designed to predict the final, stable body temperature is that the predicted final temperature is displayed at an earlier time, namely while temperature measurement is still in progress, the accuracy of the prediction operation is influenced by the elapsed measurement time, as mentioned above. It is desired, therefore, that an electronic thermometer provide a temperature reading which will conform to the required accuracy. One method of satisfying this demand is as proposed by the present invention, namely by repeatedly predicting temperature constantly and displaying the updated results of the prediction continuously.

FIG. 2 is a block diagram illustrating in some detail an embodiment of an electronic clinical thermometer according to the present invention. In FIG. 2, like reference numerals denote like or corresponding parts in the electronic clinical thermometer of FIG. 1. It should be noted that the individual elements constituting the arithmetic unit 2 specify, in the form of the labeled blocks, respective functions implemented by a program (see FIG. 3) stored in the read-only memory (ROM) of a general-purpose microcomputer. By reading the description thereof given hereinafter, those skilled in the art will be capable of readily understanding the construction and operation of the invention to a degree necessary for working the same.

Figure 9:
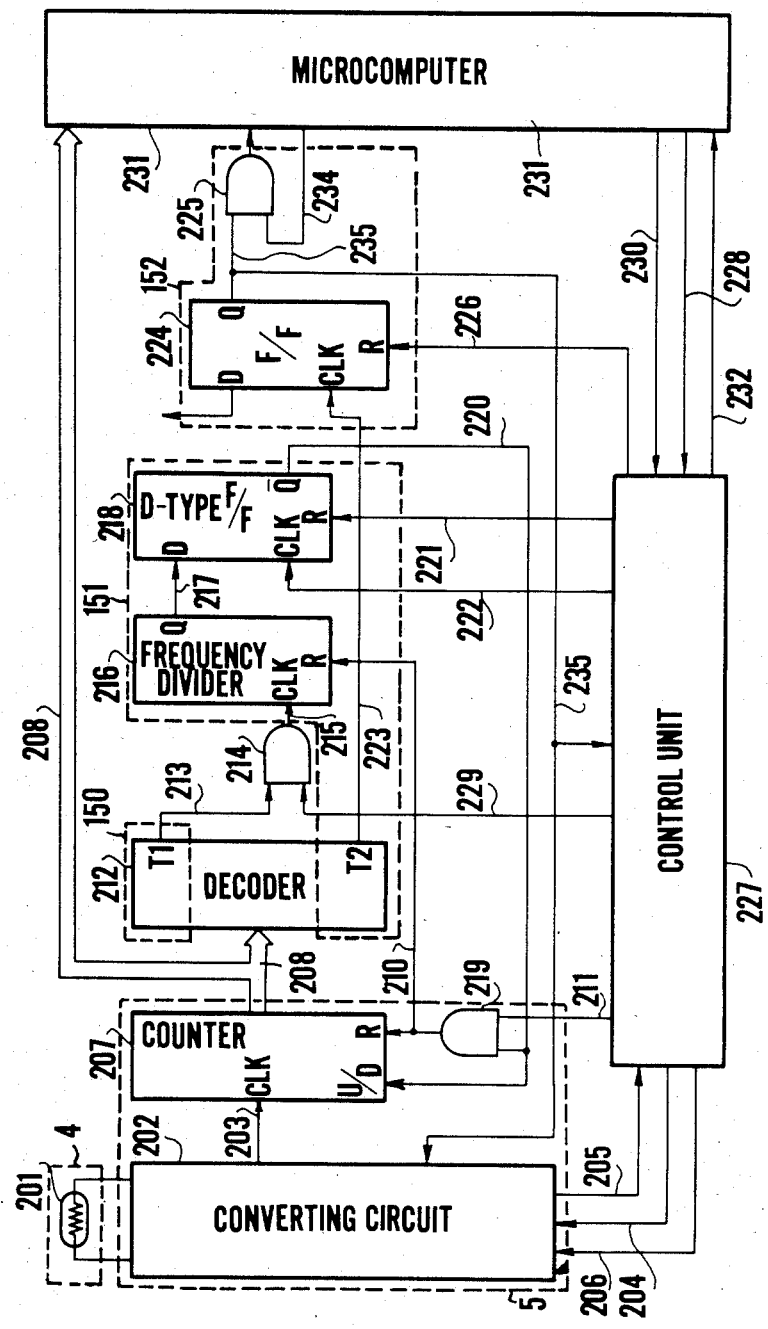
FIG. 9 is a block diagram illustrating the arrangement of FIG. 8 in greater detail.

The temperature measuring unit 1 comprises a temperature responsive element 4 such as a thermistor, and a temperature measuring circuit 5. The latter, which receives an electric signal 13 indicative of sensed body temperature received from the temperature responsive element 4, is operative to convert the signal 13 into signals 14 and 15 delivered to the arithmetic unit 2 as output signals. The signals 14, 15 are in turn convertible into signals indicative of real-time temperature. The construction of the temperature responsive element 4 and temperature measuring circuit 5 is shown in FIG. 9, described later.

The arithmetic unit 2 for predicting final temperature comprises measurement control means 7, time measuring means 6, corrective value computing means 8, adding means 9 and predicted temperature monitoring means 10. The measurement control means 7 controls the overall operation of the electronic clinical thermometer. This is achieved by constantly monitoring the signal 15 from the temperature measuring circuit 5, and supplying the time measuring means 6 with a clock signal 16 and the corrective value computing means 8 with a control signal 22 when predetermined measurement conditions are satisfied.

The time measuring means 6 responds to the clock signal 16 by clocking elapsed time from the start of measurement, producing a signal 17 indicative of the elapsed time. The corrective value computing means 8 computes, and produces a signal 18 indicative of, a corrective temperature differential U for predicting final temperature, the value of U being the difference between real-time temperature and predicted temperature attained upon stabilization, in accordance with temperature sensed at sampling instants based upon an input of the elapsed time signal 17. The corrective value computing means 8 incorporates, as a function of elapsed time, a function for obtaining the corrective temperature differential. The function includes several parameters which influence the corrective temperature differential. These parameters are reset at the initiation of measurement, for example when a control signal 22 from the measurement control means is first applied to the computing means 8, so as to take on a specific values, e.g., values defined such that a temperature rise with elapsed time will take on the form of having the highest probability of being the proper temperature change, obtained statistically by an actual measurement performed in advance. As will be described later, the corrective value computing means 8 has two functions. The first is to compute the corrective temperature differential corresponding to the elapsed time signal 17 input thereto, the output signal 18 being indicative of the computed value. The second is to alter, upon receiving a negative feedback control signal 20 from the predicted temperature monitoring means 10, the values of the parameters which influence the corrective temperature differential, namely the function for obtaining the corrective temperature differential.

The adding means 9 adds the real-time temperature signal 14 and the corrective signal 18, producing a predicted temperature signal 19, which is the sum of the corrective temperature differential and real-time temperature. The predicted temperature monitoring means 10 monitors the signal 19 constantly and decides whether the predicted temperature is within prescribed limits for a prescribed period of time. The monitoring means 10 produces the negative feedback control signal 20 when the predicted temperature is outside of these limits, and delivers the predicted temperature to the display means 3 in the form of an output signal 21 when said temperature is within the prescribed limits.

In the temperature measuring unit 1, the electric signal 13 from the temperature responsive element 4 is applied to the temperature measuring circuit 5 where the signal 13 is converted into the signals 14, 15, which are capable of being converted into real-time temperature. The output signal 15 of the temperature measuring circuit 5 is monitored constantly by the measuring control means 7, which immediately applies the clock signal 16 to the time measuring means 6 when predetermined conditions are satisfied, e.g., when the signal indicates that a certain temperature has been exceeded with a temperature change in excess of a certain value. At the same time, the control means 7 applies the control signal 22 to the corrective value computing means 8, thereby giving an instruction for computation to begin.

The corrective value computing means 8, upon receiving as an input the elapsed time signal 17 from the time measuring means 6, computes the corrective temperature differential for predicting final temperature, this value being the difference between real-time temperature and temperature attained upon stabilization. The signal 18 indicative of the corrective value is applied to the adding means 9. As mentioned above, the corrective value computing means 8 incorporates, as a function solely of elapsed time t, a function for obtaining the corrective temperature differential, inclusive of several parameters which influence the corrective temperature differential. These parameters are reset at the initiation of measurement, for example when the control signal 22 from the measurement control means is first applied to the corrective value computing means 8, so as to take on the values which define a specific temperature change. The control signal 22 is applied to the computing means 8 at the same time that the clock signal 16 is delivered to the time measuring means 6. The corrective value computing means 8 computes the corrective temperature differential as soon as the elapsed time signal 17 arrives, and delivers the corrective value signal 18 to the adding means 9.

The adding means 9 receives and takes the sum of the real-time temperature signal 14 and the corrective value signal 18, producing the predicted temperature signal 19 which is the sum of the corrective temperature differential and real-time temperature. The signal 19 is applied as an input to the predicted temperature monitoring means 10, which monitors the predicted temperature constantly. When the predicted temperature is constant for a certain period of time, the monitoring means 10 regards the results of the corrective temperature value computation performed by the computing means 8 as being appropriate. In other words, when the predicted temperature is determined to be constant for a certain time period, the monitoring means 10 decides that the selection of the computation process, function and parameter applied in the computation of the corrective temperature value are appropriate. When such is the case, the predicted temperature signal 21 is delivered to the display means 3. When the predicted temperature falls outside, say, a fixed range of temperature variation within a predetermined period of time, the monitoring means 10 applies the negative feedback control signal 20 to the corrective value computing means 8. The latter responds by implementing the abovementioned second function thereof, namely by altering the parameters which influence the corrective temperature differential. Thus, the corrective value computing means 8 recomputes the corrective temperature differential, conforming to the elapsed time signal 17, based on the altered parameters. The corrective signal 18, which is the result of this computation, is again applied to the adding means 9, the latter producing the predicted temperature signal 19 which is monitored by the predicted temperature monitoring means 10.

The monitoring means 10 repeats the foregoing process, with the predicted temperature being displayed by the display means 3. The foregoing series of process steps, namely the computation of the corrective temperature differential by the computing means 8, the addition operation performed by the adding means 9, the monitoring of the predicted temperature by the monitoring means 10, and the negative feedback applied from the monitoring means 10 to the computing means 8, are performed in a short period of time, and the predicted temperature displayed on the display means 3 is presented substantially continuously.

Next will be described the process through which final temperature reached on stabilization is predicted with the embodiment of FIG. 2. For the discussion, reference will be had to the flowchart of FIG. 3 and the corrective temperature differential curves illustrated in FIG. 4.

The first item requiring discussion is the corrective temperature differential, represented by U. In measuring body temperature, the form of temperature change from the start of measurement until the attainment of temperature stabilization differs widely depending upon the thermal characteristics of the clinical thermometer, the state of the region where the temperature is sensed, and the region itself. If the thermal characteristics of the clinical thermometer are limited, however, then the various temperature change patterns can be classified into a number of categories. In other words, placing a limitation upon the thermal characteristics will make it possible to define a number of temperature change patterns. Two major categories of temperature change are those resulting from, say, measurement orally and axillary. Several other categories may also be conceived, such as temperature change patterns exhibited by adults and children, but these are not particularly useful. Let us consider measurement of body temperature sensed in an armpit. It is known from measurement of armpit temperature for a wide variety of cases that approximately ten minutes is required for stabilization of thermometer temperature. Let U* represent the difference between final, stabilized temperature Te and a temperature T during measurement. Upon investigation, it is found that U* is expressed with good accuracy by the following formula:

$$U^* = Te - T = \alpha t + \beta + C(t+\gamma)^\delta \quad (1)$$

where:
U*: difference between stable temperature and temperature during measurement
t: time from beginning of measurement
C: variable parameter
$\alpha, \beta, \gamma, \delta$: constants in conformance with measurements made under constant conditions.

In particular, for measurement of body temperature in an armpit, the following holds with good regularity:

$$U^* = -0.002t + 0.25 + C(t+1)^{-0.6} \quad (2\leq C \leq 12) \quad (2)$$

where t is measured in seconds and U* in degrees Centigrade.

Figure 4:
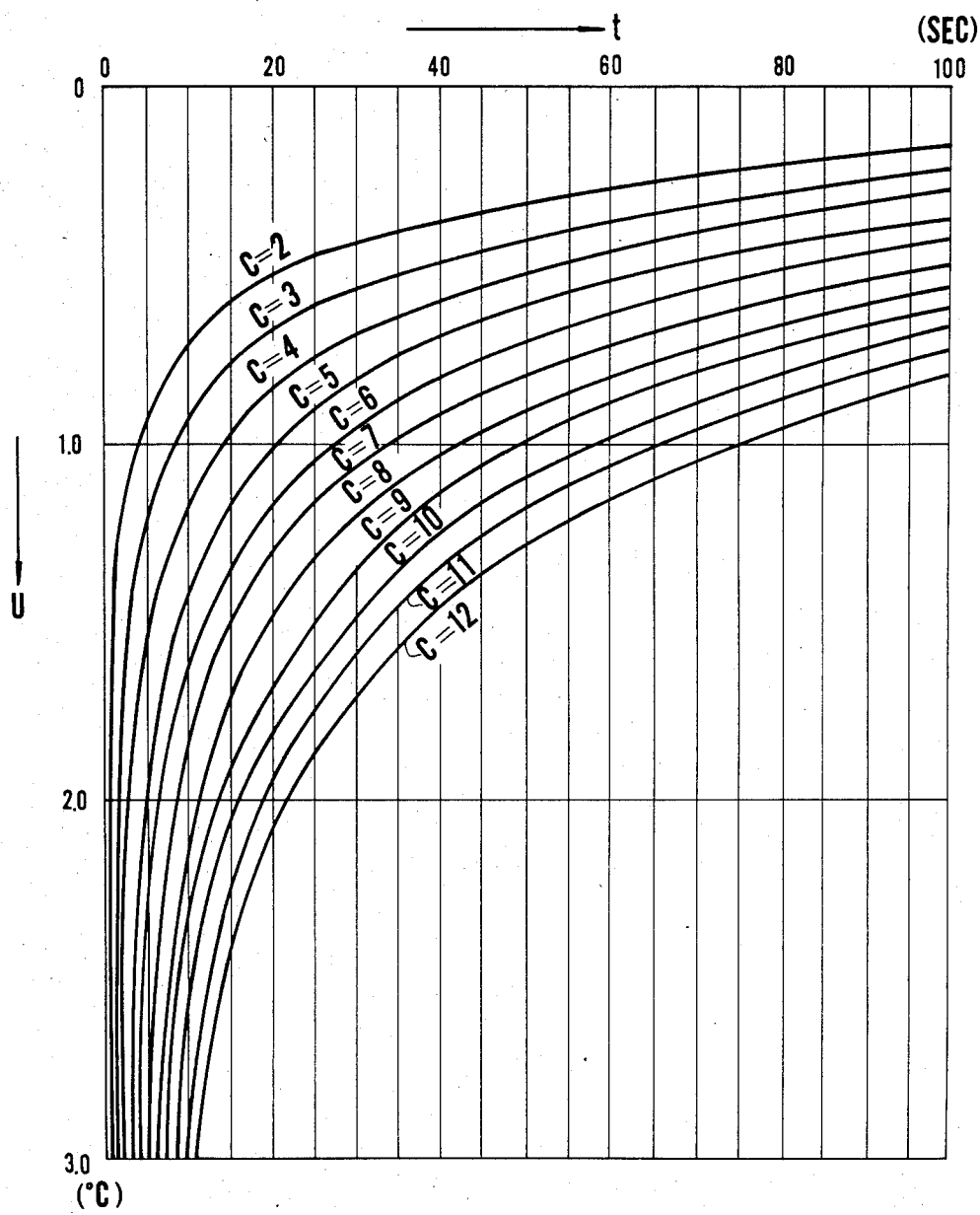
FIG. 4 is a graph indicating change, with time, of a corrective temperature differential U for prediction of final temperature in connection with a variable parameter $C=2\sim12$, where body temperature is sensed by placing the electronic clinical thermometer in an armpit.

When U* in Eq. (2) is replaced by U and the value of the parameter is varied from C=2 to C=12, the curves shown in FIG. 4 are the result. The reason for replacing U* with U is that the final temperature Te upon stabilization corresponds to a predicted temperature Tp as far as execution of the prediction process is concerned. In other words, the corrective temperature differential U during the prediction process is given by the following equation:

$$U = Tp - T = -0.002t + 0.25 + C(t+1)^{-0.6}$$
$$(2 \leq C \leq 12) \quad (3)$$

Figure 3:
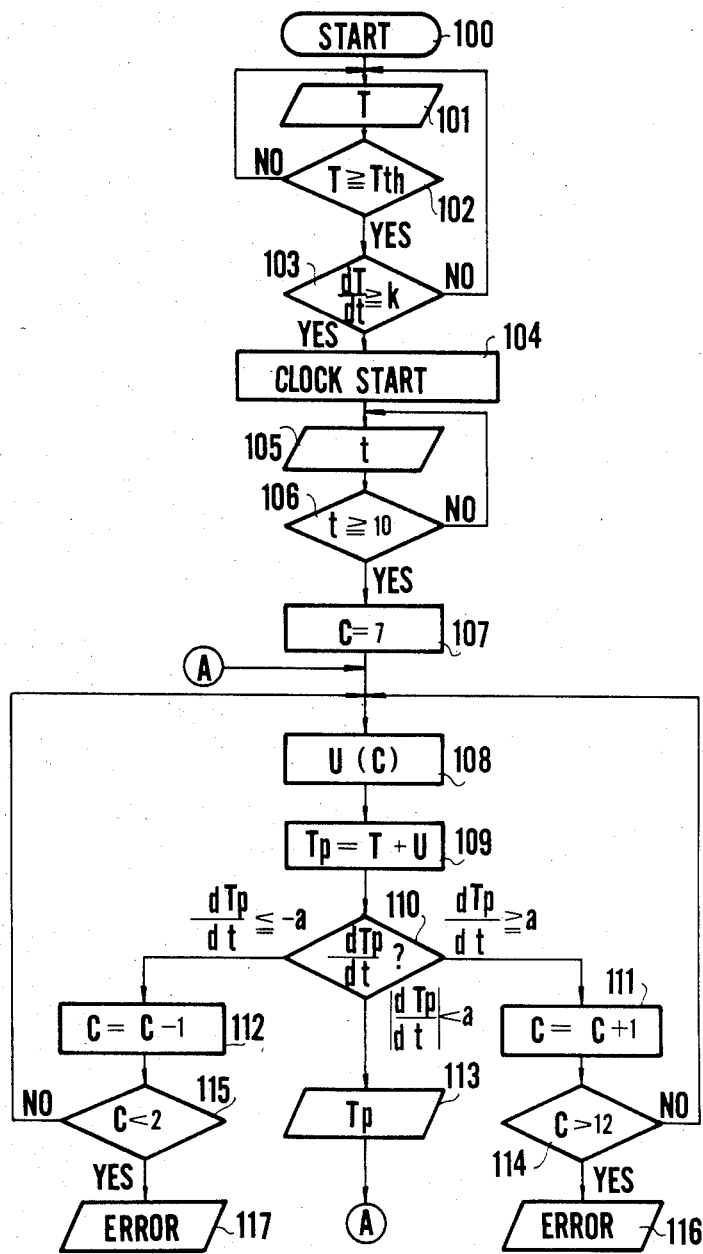
FIG. 3 is a flowchart indicating the operation of the arrangement shown in FIG. 2.

FIG. 3 is a flowchart for an algorithm describing the processing for temperature measurement as carried out by, say, the arrangement illustrated in the block diagram of FIG. 2.

With the start step 100, power is introduced to the system to actuate the temperature measuring circuit 5 (FIG. 2), upon which the process moves to a temperature measurement step 101. In this step, the signal 15 from the temperature measuring circuit 5 is monitored by the measurement control means 7. In decision steps 102, 103 it is decided whether or not a measurement of body temperature is to be performed. Specifically, in step 102, it is decided whether a predetermined temperature, say a temperature of 30° C., has been exceeded. Step 103 decides whether the temperature rise is equal to or greater than 0.1° C. per second. Both of these decisions are executed by the measurement control means 7. If an affirmative decision is rendered in both cases, then the process moves to the clock (reset) start step 104.

In step 104, a counter in the time measuring means 6 for measuring elapsed time is reset by the first clock signal 16 generated by the measuring control means 7 and, at the same time, an elapsed time measurement begins in step 105. Step 106 is a decision step which calls for waiting a certain period of time until a subsequent temperature prediction step takes on meaning. For example, the system waits in standby for ten seconds until start of a computation for a corrective temperature. The reason is that the accuracy of temperature prediction is extremely poor, and would give unsatisfactory results, for a period of less than ten seconds.

Figure 5:
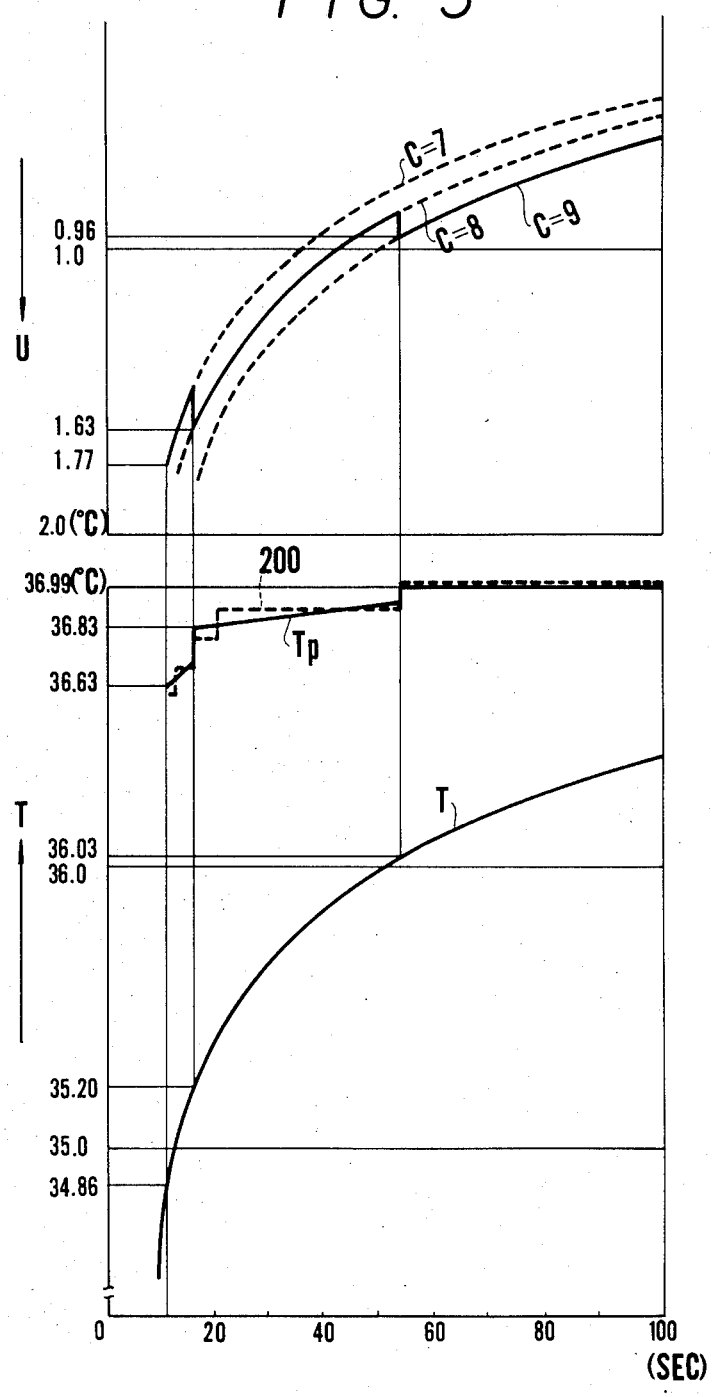
FIG. 5 is a graph of actually measured temperature T, predicted temperature Tp and corrective temperature differential U, for describing a change in predicted temperature with time.

When measured results are available for an elapsed time of ten seconds or more, the measurement control means 7 produces the control signal 22, which executes an initial setting step 107. In this step, the parameter C of the arithmetic expression incorporated in the corrective temperature value computing means 8 is set to a value having the highest probablity of being the proper value for reaching a predicted, final temperature. In the illustrated embodiment, C=7 in step 107. Next, step 108 calls for computation of the corrective temperature factor within the computing means 8, the latter supplying the adding means 9 with the signal 18 indicative thereof. The computation performed by the computing means 8 corresponds exactly to Eq. (3) above. The first computation gives as results a point on the curve marked C=7 in FIG. 4 and on the curve marked C=7 in FIG. 5. Accordingly, for t=11 sec, we have U=1.77° C. This is applied to the adding means 9 as the corrective value signal 18. Step 109 calls for the adding means 9 to add the real-time temperature signal 14 and the corrective value signal 18 and deliver the sum to the predicted temperature monitoring means 10 as the predicted temperature signal 19. For example, since U=1.77° C. in the present example, and if T=34.86° C., Tp=36.63° C. will be applied to the monitoring means 10 by the adding means 9 upon performing the addition Tp=T+U. The curve for Tp is as shown in FIG. 5.

The monitoring means 10 will receive a value of the predicted temperature Tp at a regular time interval, with C in the computation being the same at least two consecutive times. In a decision step 110, therefore, the predicted temperature Tp is investigated for any increase or decrease from one arrival to the next.

Three decisions are capable of being rendered in step 110 by comparing the change in Tp with a certain value a. If the decision is $dTp/dt \geq a$, this indicates that a final temperature higher than that predicted at the present time can be expected. Accordingly, the process moves to a step 111 to increase the value of the parameter C. If the decision is $dTp/dt \leq -a$, then this indicates that a final temperature lower than that predicted at the present time can be expected. The process therefore moves to a step 112 to decrease the value of the parameter C. For $|dTp/dt| < a$, the indication is that the final temperature predicted at the present time lies within limits where said temperature can be regarded as being approximately equal to the final temperature predicted previously. Therefore, the selected temperature prediction function is deemed to be appropriate, and processing moves to step 113 to display the present Tp. In steps 111, 112, the negative feedback control signal 20 from the monitoring means 10 is applied to the corrective value computing means 8 to change the parameter C. The value of the new parameter C is checked within the computing means 8 in accordance with steps 114, 115 and is used as the parameter in step 108 for recomputation of the corrective value providing that upper and lower limits are not exceeded, i.e., provided that the increased parameter C does not exceed the set upper limit value 12 in decision step 114, and that the decreased parameter C does not fall below the set lower limit value 2 in decision step 115. The display step 113 calls for the predicted temperature signal 21 to be produced as an output by the predicted temperature monitoring means 10 so that the predicted temperature at the present point in time may be displayed by the display means 3. When step 113 ends, the process returns to the corrective value computation step 108 while the predicted temperature remains displayed on the display means 3. Thus, the predicted temperature is displayed on the display means 3, after such processing as rounding after a certain signficant place, only when the condition $|dTp/dt| < a$ is satisfied. The displayed value is retained until the next display step. The processing indicated by the loops composed of steps 108 through 115 is controlled by the measurement control means 7 so as to be repeated at a predetermined interval of, say, one second. When the upper limit C=12 in decision step 114 or the lower limit C=2 in the decision step 115 is exceeded, step 116 or 117 calls for a display to inform the operator of an error. Such a display indicates that the thermometer has been shifted during measurement, that a measurement is proceeding abnormally, or that some other problem has arisen.

In the example of FIG. 3, the algorithm alters the value of the parameter C in increments or decrements of one. In such case the resolution of the predicted temperature will be on the order of 0.1° C. at about 50 seconds into the prediction computations. To obtain even greater resolution, therefore, the value of the parameter C should be incremented or decremented by 0.5 in steps 111 or 112. Further, the value of a in the decision step 110 need not be constant. It can, for example, be a function the value whereof diminishes with time. Such an expedient is preferred in view of the fact that the temperature difference separating one corrective temperature curve from another in FIG. 4 grows smaller with the passage of time. To compute dTp, obviously various methods are conceivable using a running average or two values of Tp separated widely in time, so long as there is no significant influence upon the accuracy of measurement. In any case, even when the display step 113 is selected as the result of the decision in step 110, processing returns to step 110 through the corrective value computation step 108 and adding step 109 for computation of Tp. As this loop is stepped through repeatedly a number of times, the computation for predicting temperature may be regarded as following the actual temperature change. Accordingly, the computed value of the predicted final temperature will stabilize, there will be almost no change in the displayed value thereof, and the corrective value U will follow the curve C=7 in FIG. 5 until t=16 seconds.

At time t=16 sec, the decision rendered in step 110 is $dTp/dt \geq a$, upon which the process moves to step 111 where the parameter C is incremented to 8. On the curve C=8, we will have U=1.63° C. If the actually measured temperature T is 35.20° C. at such time, then the result of computation in step 109 will be Tp=36.83° C. Now, in accordance with step 110, two values of the predicted temperature, for the same C (=8), are checked at the prescribed time interval. As long as the change in Tp does not exceed a certain value, the loop which includes the display step 113 is stepped through repeatedly, so that a value of Tp in the neighborhood of 36.8° C. is displayed continuously. At time t=53 sec, processing again shifts to the loop decided by $dTp/dt \geq a$, so that the curve tracked is indicated by C=9. Since U=0.96° C., T=36.03° C. will now hold, the result of calculation in step 109 will be Tp=36.99° C. From this point onward the prediction of temperature proceeds along the curve C=9. The value displayed upon being rounded off is as indicated by the dashed line 200 in FIG. 5.

Thus, as described hereinabove, body temperature which will prevail upon stabilization of the thermometer is predicted and displayed substantially continuously.

In the algorithm illustrated in FIG. 3, the parameter C is intially set to the value of 7 in step 107. By doing so, however, there may be instances where the displayed predicted temperature Tp diminishes with time, owing to the method of processing or the way in which the value of a is selected in the decision step 110 for monitoring the predicted temperature. To give the operator a more natural impression of temperature transition, therefore, C can be set initially to 2 in step 107, so that the display temperature will, in general, rise with the passage of time, in which the final, stable temperature is approached rapidly with respect to elapsed measurement time.

Figure 6:
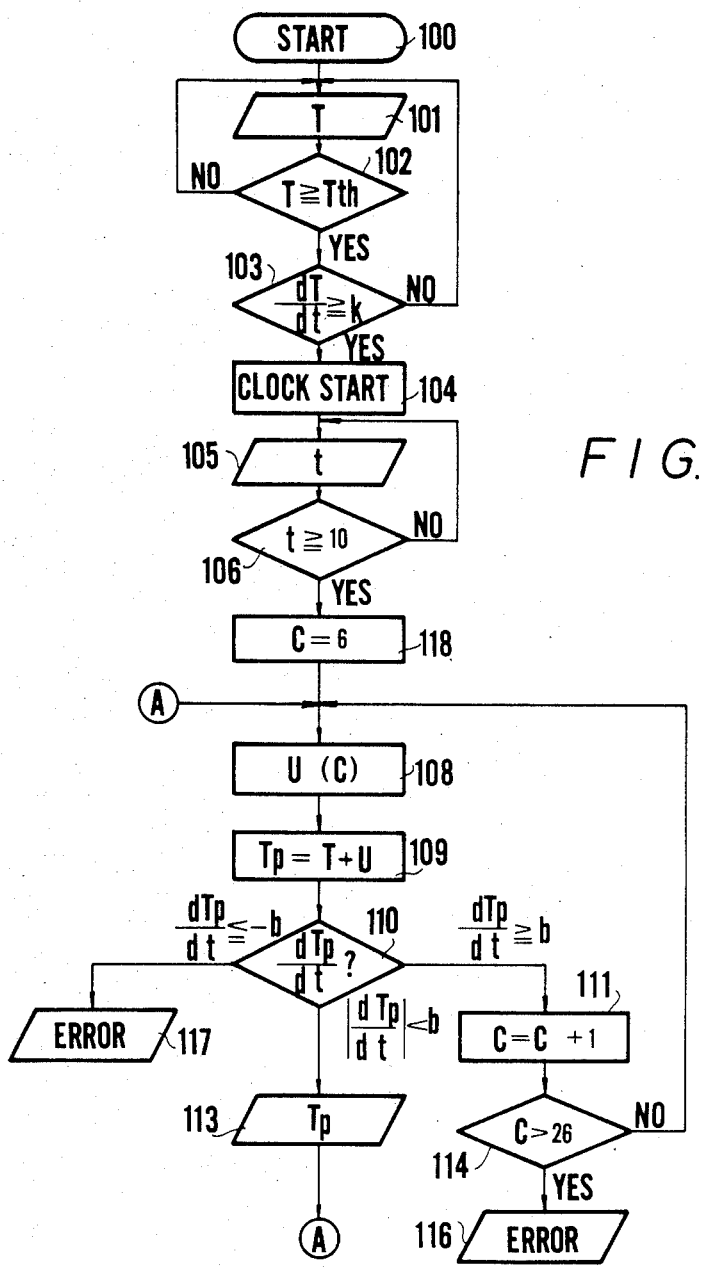
FIG. 6 is a flowchart indicating an operation for predicting body temperature for a case where temperature is sensed orally.

FIG. 6 shows a flowchart of processing for predicting temperature where the temperature is sensed orally. Steps similar to those of FIG. 3 are designated by like reference numerals and are not described again to avoid prolixity. In this case, the prediction of temperature starts with an initial minimum setting of C=6 for the parameter C, this being effected in step 118. With an oral temperature measurement, the corrective temperature differential U may be found from the following equation, which is deemed most appropriate. The set value b used in the decision step also is chosen accordingly. U is found from:

$$U = Tp - T = -0.001t + 0.05 + C(t+1)^{-1.0}$$
$$(6 \leq C \leq 26) \quad (4)$$

In measuring body temperature orally in the present embodiment, computation for predicting temperature starts with the minimum value (6) of the parameter C. Therefore, when the decision rendered in step 110 is $dTp/dt \leq -b$, processing moves to step 117, which calls for immediate display of "ERROR". As for the value a used in the comparison effected in decision step 110 of FIG. 3 and the value b used in the comparison performed in decision step 110 of FIG. 6, the criterion for the magnitudes thereof is indicated by the function f(t,A,C) used in decision step 110 of FIG. 7, as will be described below. A value selected suitably from this function may be employed as a or b.

Figure 7:
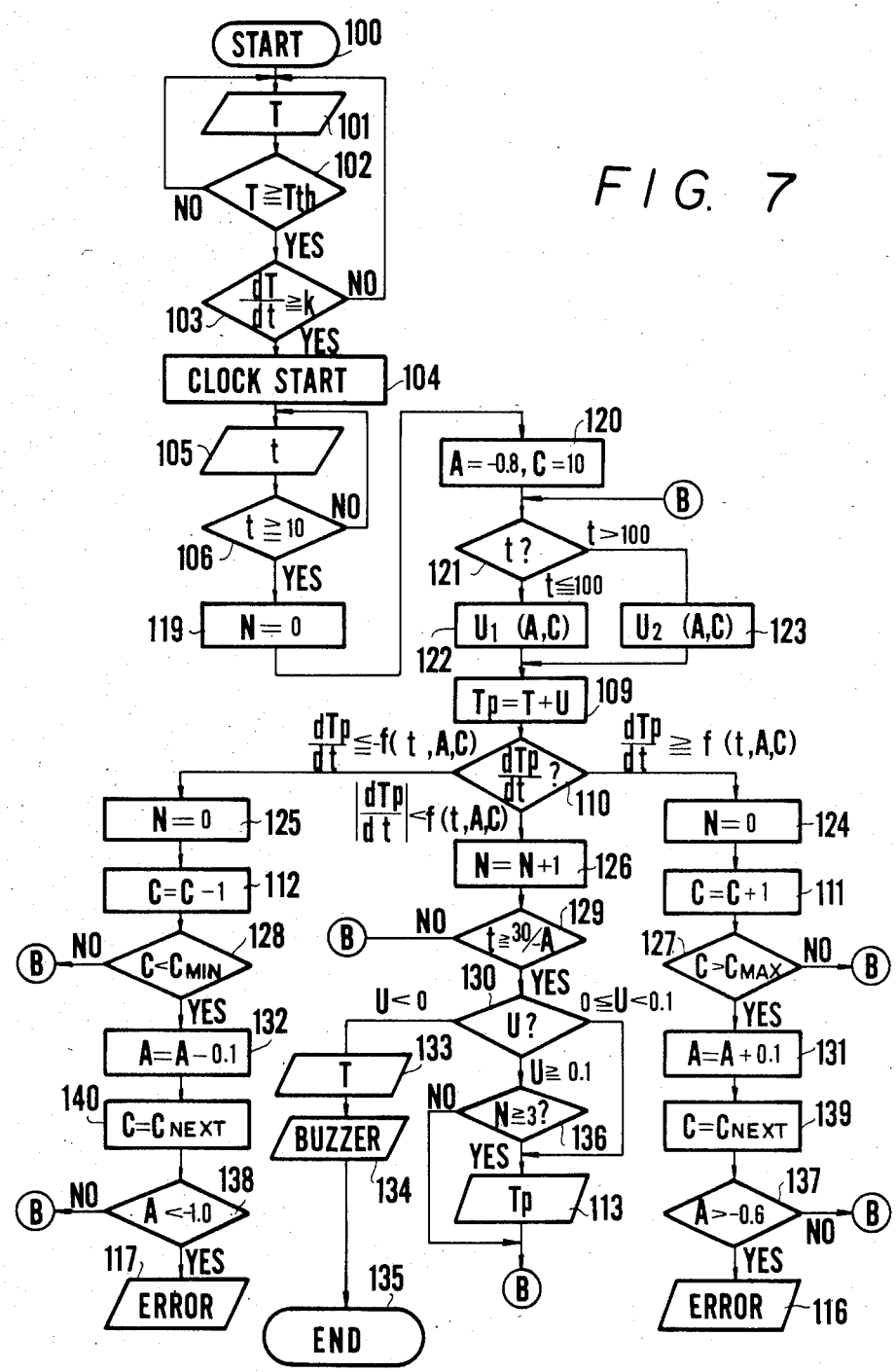
FIG. 7 is a flowchart indicating an arithmetic algorithm for predicting final temperature, which algorithm which can be applied to temperature sensing performed both orally and in an armpit.

FIG. 7 illustrates an algorithm for computing predicted temperature with an electronic clinical thermometer capable of temperature measurement orally or placement of the thermometer in an armpit. Steps corresponding to those shown in FIG. 3 are designated by like reference numerals and are not described again to avoid prolixity. The fundamental equation giving the corrective temperature differential is as follows (where $10 < t \leq 100$):

$$U = (-0.0025A - 0.0035)t + 0.5A + 0.55 + C(t+1)^A \quad (5)$$

In Eq. (5), the parameters are two in number, namely A and C. When $A = -0.6$, Eq. (5) reduces to Eq. (3) for obtaining the corrective temperature differential by armpit measurement. When $A = -1.0$, the result is Eq. (4) for obtaining said differential by oral measurement. The relationship between A and the maximum and minimum values of C, namely $C_{MAX}$ and $C_{MIN}$, is illustrated in Table I.

TABLE I

| A | $C_{MIN}$ | $C_{MAX}$ |
|---|---|---|
| −0.6 | 2 | 12 |
| −0.7 | 6 | 12 |
| −0.8 | 9 | 11 |
| −0.9 | 8 | 18 |
| −1.0 | 6 | 26 |

Step 119 in FIG. 7 calls for initially setting the count N to 0. The count N is incremented in step 126 when it is decided in the predicted temperature monitoring step 110 that the value of change in Tp is within the appropriate limits. At other times, namely when a decision is rendered that the appropriate limits have been exceeded, N is reset to zero in step 124 or 125. When it is decided in decision step 136 that the value of change in Tp has been within the appropriate limits at least three consecutive times, namely that $N \geq 3$, processing moves to step 113 for displaying Tp. Since it may still be undetermined as to whether temperature is to be taken orally or in an armpit, A is set to −0.8 and C is set to 10 in an initial setting step 120. The purpose of this step is to select values of these parameters which will allow a transition to either side. A step 121, in which 100 seconds serves as a boundary value for t, is provided for dealing with a case where the expression for obtaining the corrective temperature differential changes in the following manner:

$$U = (-0.0025A - 0.0035)t + 0.5A + 0.55 + C(t+1)^A + 0.02(t-100)/(C+10) \quad (6)$$

where $t > 100$. Thus, computation according to Eq. (5) is performed in step 122, computation according to Eq. 6 is performed in step 123.

The following function f(t, A, C) of t, A and C is used as the standard for the decision rendered in block 110 for monitoring the predicted temperature:

$$f(t, A, C) = -A(t+1)^{A-1} \quad (7)$$

when $10 \leq t \leq 100$, and $$f(t, A, C) = 0.02/(C+9)(C+11) \quad (8)$$

when $t > 100$.

Three decisions are capable of being rendered in step 110 by comparing the change in Tp with the function f(t, A, C). If the decision is $dTp/dt \geq f(t, A, C)$, processing moves to the loop containing step 111 to increase the value of the parameter C. If the decision is $dTp/dt \leq -f(t, A, C)$, processing moves to the loop containing step 112 to decrease the value of the parameter C. For $|dTp/dt| < f(t, A, C)$, processing moves to the loop containing step 126 to increase N.

A step 129 is provided to prevent the presentation of a display shortly after measurement when the accuracy of the predicted temperature is still too poor. Step 130 calls for a decision regarding the magnitude of the corrective temperature differential. When $U < 0$ holds, the real-time temperature T itself is displayed in step 133, a buzzer is activated in step 134, and processing comes to an end in step 135. When the decision rendered in step 130 is $0 \leq U \leq 0.1$, this indicates that the corrective temperature differential is already sufficiently small. Processing therefore moves to the display step 113 for displaying the predicted temperature Tp. When $U \geq 0.1$ holds, this indicates that the corrective temperature differential is still not sufficiently small. Therefore, in order to assure the prediction operation, processing moves to the decision step 136 where a decision is rendered on the number of times N this particular path has been traversed consecutively, N having been incremented in step 126. When the decision rendered in step 136 is $N \geq 3$, processing advances to step 113 to display the predicted temperature Tp obtained in step 109. Steps 127, 128 are for deciding whether the upper and lower limits, respectively, of the parameter C have been exceeded, in accordance with TABLE I above. Similarly, steps 137, 138 are for deciding whether the upper and lower limits of the parameter A have been exceeded, respectively. When the decision in step 127 or 128 is affirmative, the parameter A is updated in step 131 or 132, respectively. The parameter C prevailing at this time is reset to the upper or lower limit value corresponding to the new parameter A shown in TABLE I.

Let us describe an example for a case in which an initial setting, performed in step 120, is updated. When the parameter C is found to exceed 11 in step 127, processing moves to step 131 in which 0.1 is added to the parameter A, making A equal to −0.7. In the following step 139, the parameter C is set to a new value 6 ($C_{NEXT}$) in accordance with TABLE I. Then, in step 137, it is decided whether the parameter A is greater than the upper limit value −0.6. When the decision is "NO", the system returns to step 121. When the decision is "YES" in step 137, processing moves to step 116 and "ERROR" is displayed. When the parameter C is found to be less than 9 in step 128, processing moves to step 132 where 0.1 is subtracted from the parameter A, making A equal to −0.9. Then, as described above, processing moves to step 140 where the parameter C is set to a new value of 18 ($C_{NEXT}$) in accordance with TABLE I. Next, step 138 calls for a decision as to whether the parameter A is smaller than the lower limit value −1.0. If the decision is "NO", processing returns to step 121; if "YES", processing moves to step 117, whereby "ERROR" is displayed.

Figure 8:
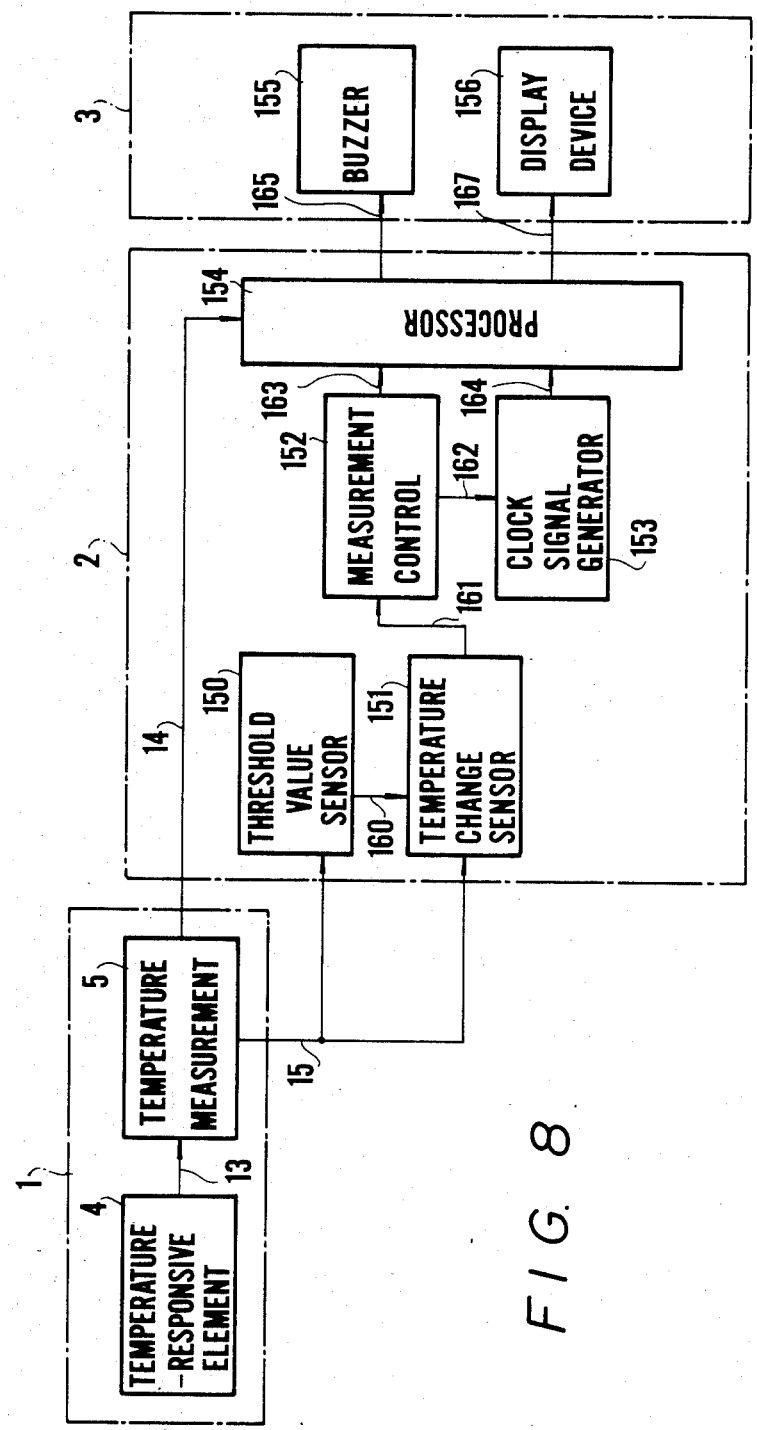
FIG. 8 is a block diagram illustrating, in some detail, the construction of an electronic clinical thermometer according to another embodiment of the present invention.

With the present state of the art, the hardware arrangement of FIG. 8, which makes use of a microcomputer, is well-suited for implementing the complicated temperature prediction algorithm of the kind shown in FIG. 7. The hardware in unit 2 consists of circuits 150, 151, 152 and 153, described below. The microcomputer is represented by a microprocessor 154. Like reference numerals in the arrangement of FIG. 8 denote like or corresponding parts in the arrangment of FIG. 2.

Referring now to FIG. 8, the temperature signal 14 from the temperature measuring circuit 5 is applied as an input to the processor 154 constituting part of the arithmetic unit 2. The temperature signal 15 from the temperature measuring circuit 5 is applied as an input to a temperature threshold value sensing circuit 150 and to a temperature change sensing circuit 151. The sensing circuit 150, which executes step 102 in FIG. 7, comprises a comparator for determining whether the temperature T expressed by signal 15 has exceeded a threshold temperature Tth, producing a signal 160 when such is the case. The temperature change sensing circuit 151, which executes step 103, determines whether the change in the temperature T with time, represented by signal 15, has exceeded a predetermined value k, and produces a control signal 161 when such is the case.

The control signal output 161 of the temperature change sensing circuit 151 is connected to a measurement control circuit 152. The latter produces an output 162 applied to a clock signal generating circuit 153, and an output 163 applied to the processor 154. The measurement control circuit 152 responds to the control signal 161 by actuating the clock signal generating circuit 153, and instructs the processor 154 to execute the process steps from step 119 onward. The clock pulse generating circuit produces a clock pulse output 164 supplied to the processor 154, the latter responding by executing the aforementioned processing steps. In the illustrated embodiment the processor 154 can be realized in the form of a single-chip microcomputer.

The display unit 3 in FIG. 8 includes a buzzer circuit 155 for an audible alarm, as well as a display device 156. The latter receives, as an input thereto, a signal 167 from the processor 154 indicating the predicted temperature, real-time temperature and any error which is detected, the display device 156 being operative to display this information visually. The buzzer circuit 155 emits an audible tone, indicating the end of a measurement, in response to a measurement end signal 165 produced by the processor 154 in step 134.

In accordance with the embodiment of FIG. 8, the temperature threshold value sensing circuit 150 implements step 102 upon receiving the temperature signal 15 from the temperature measuring circuit 5. When the relation T≧Tth holds, the temperature change sensing circuit 151 is enabled by the signal 160, thereby executing step 103 to produce the signal 161 when the relation dT/dt≧k is found to hold. The signal 161 in turn enables the measurement control circuit 152 which responds by simultaneously actuating the clock signal generating circuit 153 with the signal 162 and by sending the signal 163 to the processor 154. The latter then executes the process steps from 119 onward. More specifically, when the processor 154 reads in the clock signal 164 from the clock signal generating circuit 153 and the temperature signal 14 from the temperature measuring circuit 5, processing for predicting temperature is executed in accordance with the algorithm shown in FIG. 7, starting from step 119. When processing moves to step 134 for sounding the buzzer, the processor applies the signal 165 to the buzzer circuit 155. When processing moves to the display steps 113, 133, 116, 117, the processor produces the signal 167 indicative of the predicted temperature (step 113), the real-time temperature (step 133), or an error (step 116 or 117), in response to which the display device 156 will indicate the corresponding temperature or display the word "ERROR".

Reference will now be had to FIGS. 9 through 13 for a more detailed description of the hard-wired logic for implementing a portion of the algorithm shown in FIG. 7, described briefly hereinabove in connection with FIG. 8. As for the correspondence between the components of FIG. 8 and those of FIG. 9, the temperature sensing element 4 in FIG. 8 corresponds to a thermistor 201 in FIG. 9, and the temperature measuring circuit 5 is equivalent to a converting circuit 202 and counter 207 in FIG. 9. The circuit 150 for sensing the temperature threshold value corresponds to the portion of a decoder 212 having an output terminal T1, and the temperature change sensing circuit 151 to a portion of the decoder 212 having an output terminal T2, a frequency divider 216, and a D-type flip-flop 219. The measurement control circuit 152 corresponds to a flip-flop 224 and an AND gate 225. The counterpart of the processor 154 in FIG. 8 is the microcomputer 231.

Figure 11:
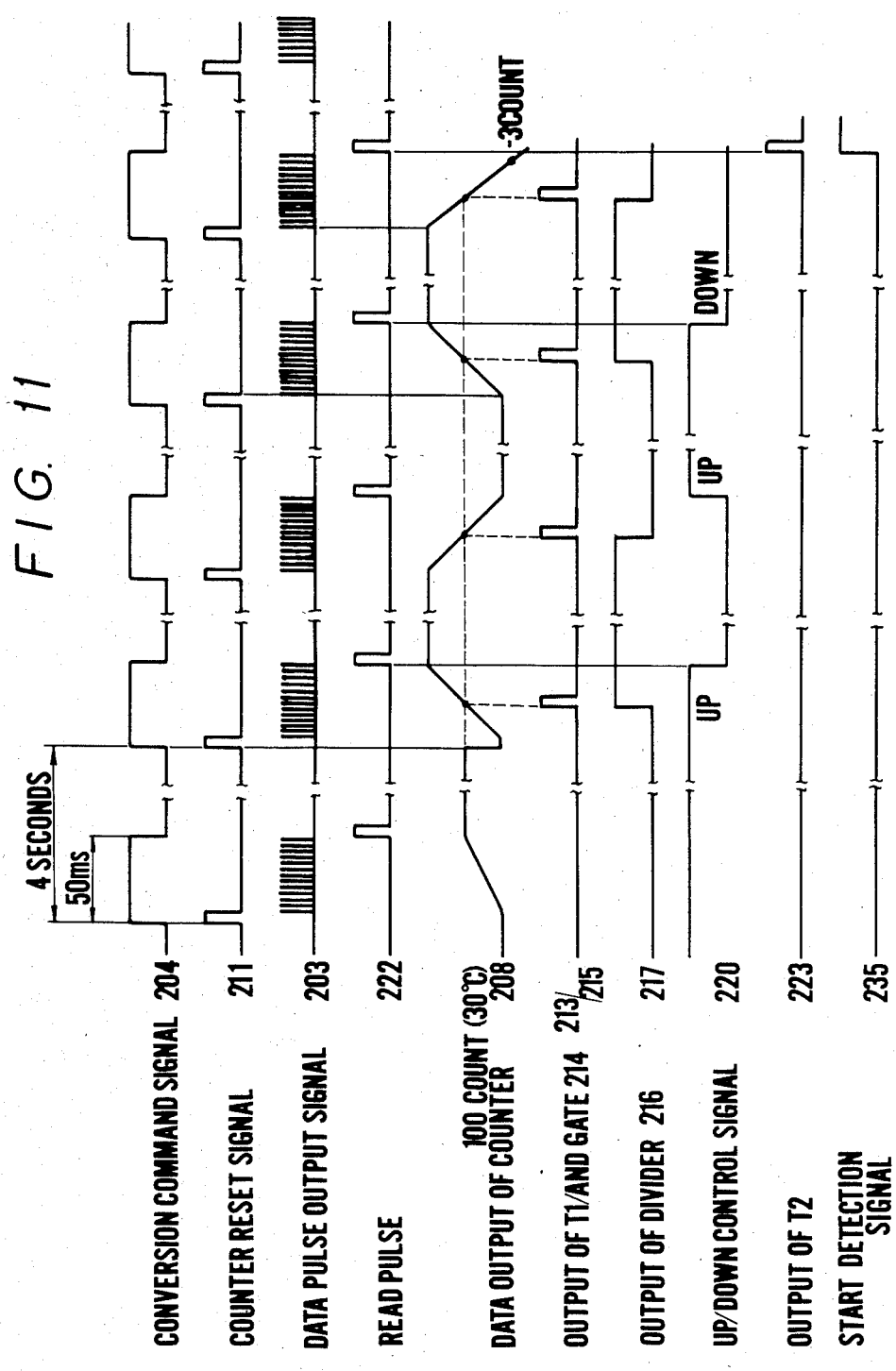
FIG. 11 is a timing chart useful in describing the operation of the arrangement shown in FIG. 9.

The construction of the arrangement shown in FIG. 9 will be described in further detail with reference to the timing chart of FIG. 11.

The thermistor 201 for measuring body temperature is connected to the converting circuit 202 for converting resistance into a pulse frequency. The converting circuit 202 receives a reference clock signal 206 and a conversion command signal 204 from a control unit 227. When the command signal 204 from the control unit 227 goes to logical "1", thereby constituting a start signal, the converting circuit 202 begins the conversion operation. Signal 204 is sent to logical "0" by a conversion end signal 205 which the converting circuit 202 delivers to the control unit 227, ending the conversion operation.

Figure 10:
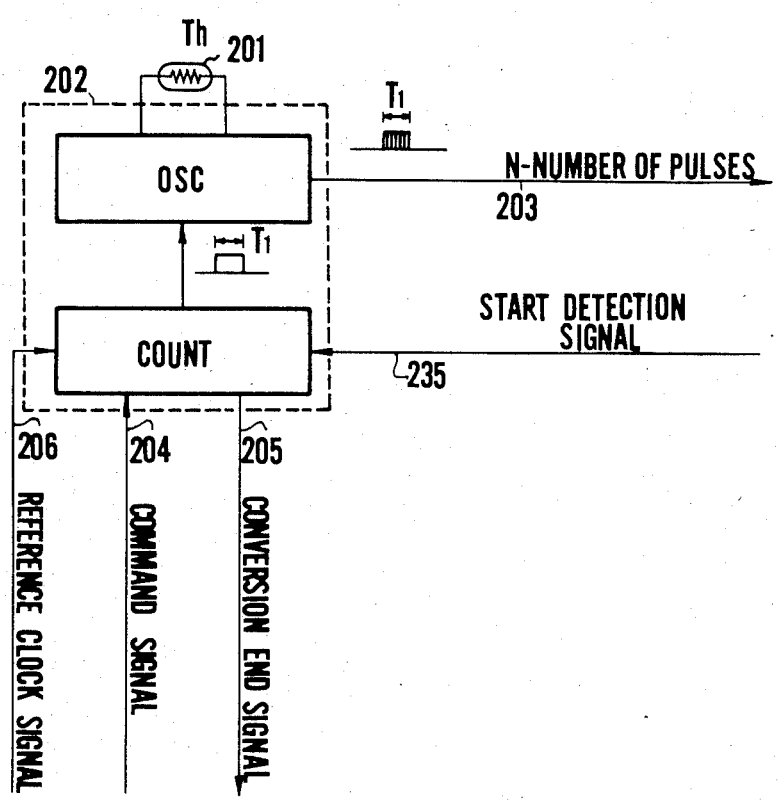
FIG. 10 is a circuit diagram illustrating the construction of a converter, included in the arrangement of FIG. 9, for converting resistance into a number of pulses.

As shown in FIG. 10, the converting circuit 202 includes an oscillator OSC the oscillation frequency whereof varies with the resistance of the thermistor 201, and a counter COUNT for controlling oscillation, and is adapted to deliver pulses 203 which the oscillator produces during a fixed time interval (namely the conversion time of the converting circuit). These pulses constitute the output of the converting circuit 202. The counter COUNT, which controls the time for carrying out the conversion, responds to the conversion command signal 204 by supplying the oscillator OSC with a conversion command of a predetermined duration T1. Upon receiving the signal, the oscillator OSC produces a number of pulses corresponding to the length of time T1. The counter produces the conversion end signal 205 when the conversion time T1 expires. It should be noted that when the counter COUNT receives a measurement start detection signal 235, to be described below, the counter COUNT is set to produce a conversion time longer than T1. These measures of time are produced on the basis of the reference clock signal 206.

Returning to FIG. 9, the abovementioned pulses produced by the converting circuit 202 exit as a data pulse output signal 203. These pulses constitute the clock (CLK) input to a counter 207. The counter 207 is of the reversible counting-type and has an up/down (U/D) terminal for deciding the counting direction. When logical "1" appears at terminal U/D, the counter 207 counts up its clock input. Logical "1" at terminal U/D causes the clock input to be counted down. R denotes the reset terminal of counter 207. The data output 208 (corresponding to the signals 14, 15 in FIG. 8) of counter 207 is applied to the decoder 212 as a data input. The decoder 212 is adapted to produce a logical "1" output on its output terminal T1 upon receiving from counter 207 a data input equivalent to 100 pulses, this occurring when the thermistor 201 senses a temperature of 30° C. This corresponds to step 102 in FIG. 7. A signal appears on output terminal T2 of the decoder 212 when logical "0" is applied to the U/D terminal of counter 207 and the counter counts down to −3, applying this data to the decoder 212. The output signal obtained from terminal T1 is denoted at 213. This signal is applied to an AND gate 214 whose other input is a decode control signal 229 from the control unit 227. The decode control signal 229 is produced by a counter 306 (shown in FIG. 12) for enough time so as to enable the AND gate 214 to detect the output T1 of decoder 212 which will be produced by the counter 207 after it starts up/down counting. When the thermistor 201 senses a temperature of 30° C. or more, causing an output to appear on terminal T1 of the decoder 212, and when the decode control signal 229 is logical "1", the output signal 217 of the divide-by-2 frequency divider 216 goes to logical "1". This signal is applied to the data input of the data-type flip-flop 218. The clock input to the flip-flop 218 is a read pulse 222 produced by the control unit 227 in sync with the trailing edge of the conversion command signal 204 in order that the data input may be stored in the flip-flop 218. With the data input to the data-type flip-flop 218 being logical "1", the Q output of the flip-flop 218, namely an up/down control signal 220, goes to logical "0". The counter 207, which receives the Q output at its U/D terminal, is switched over from the up-count to the down-count mode and begins counting down the pulses 203. In addition, a counter reset signal 211 is gated by an AND gate 219 and not allowed to pass. Accordingly, the data pulse input 203 to the counter 207 resulting from the next conversion command signal 204 will count down the counter from the value of the previous up-count operation.

The final value resulting from the down-count operation will be zero when the previously measured temperature and the temperature just measured are the same. When the latter is higher, however, counter 207 is counted down beyond zero to a negative value. When this value reaches a count of, say, −3 (corresponding to a temperature of +0.3° C.) or a more negative value, an output pulse 223 emerges from terminal T2 of decoder 212 and enters a flip-flop 224 which responds by producing a signal 235 indicating that a meaningfull measurement may begin. This signal is applied to the converting circuit 202, placing it in a body temperature measurement mode and elevating its precision. The signal 235 is also applied to the restart terminal of the microcomputer 231. The AND gate 225 performs the AND operation between this signal and an interruption-request signal 234 generated every second (producing a signal corresponding to the signal 163 in FIG. 8), whereby the microcomputer 231 is started every second from its interrupt-start address. The foregoing process corresponds to step 103 in FIG. 7.

A measurement start signal 230 produced as an output by the microcomputer 231 every second functions as a sampling command. When the signal enters the control unit 227, the latter produces the conversion command signal 204 whereby the value corresponding to the temperature measured by the thermistor 201 appears as the output data 208 from counter 207. This value is then read in, operated upon, processed in accordance with subsequent step 121 in FIG. 7 and predicted temperature is displayed when it satisfies the requirements for display. At the end of the body temperature measurement, the microcomputer 231 sends a measurement end signal 228 to the control unit 227 to again establish a pre-measurement mode for sensing the start of a measurement. The microcomputer 231 again enters a stand-by state at this time to reduce power consumption. It should be noted that the buzzer circuit 155 and display device 156 are connected to the microcomputer 231 as output means, as illustrated ih FIG. 8.

Returning to the state of counter 207, a count of less than −3 (i.e., −2, −1, 0, +1 . . . ) will not cause the decoder 212 to produce the pulse 223. Flip-flop 224 therefore will not change state, and signal 235 will not appear. Since the divide-by-two frequency divider 216 is receiving the decoded output 215 at the start of the down-count operation, the output of the frequency divider again changes state at this time and, in consequence, so does flip-flop 218. The resulting high level of signal 220 places the counter 207 in the up-count mode and, with the arrival of signal 211, in the reset state. This re-establishes the conditions for detection of a temperature of 30° C. or more.

Figure 12:
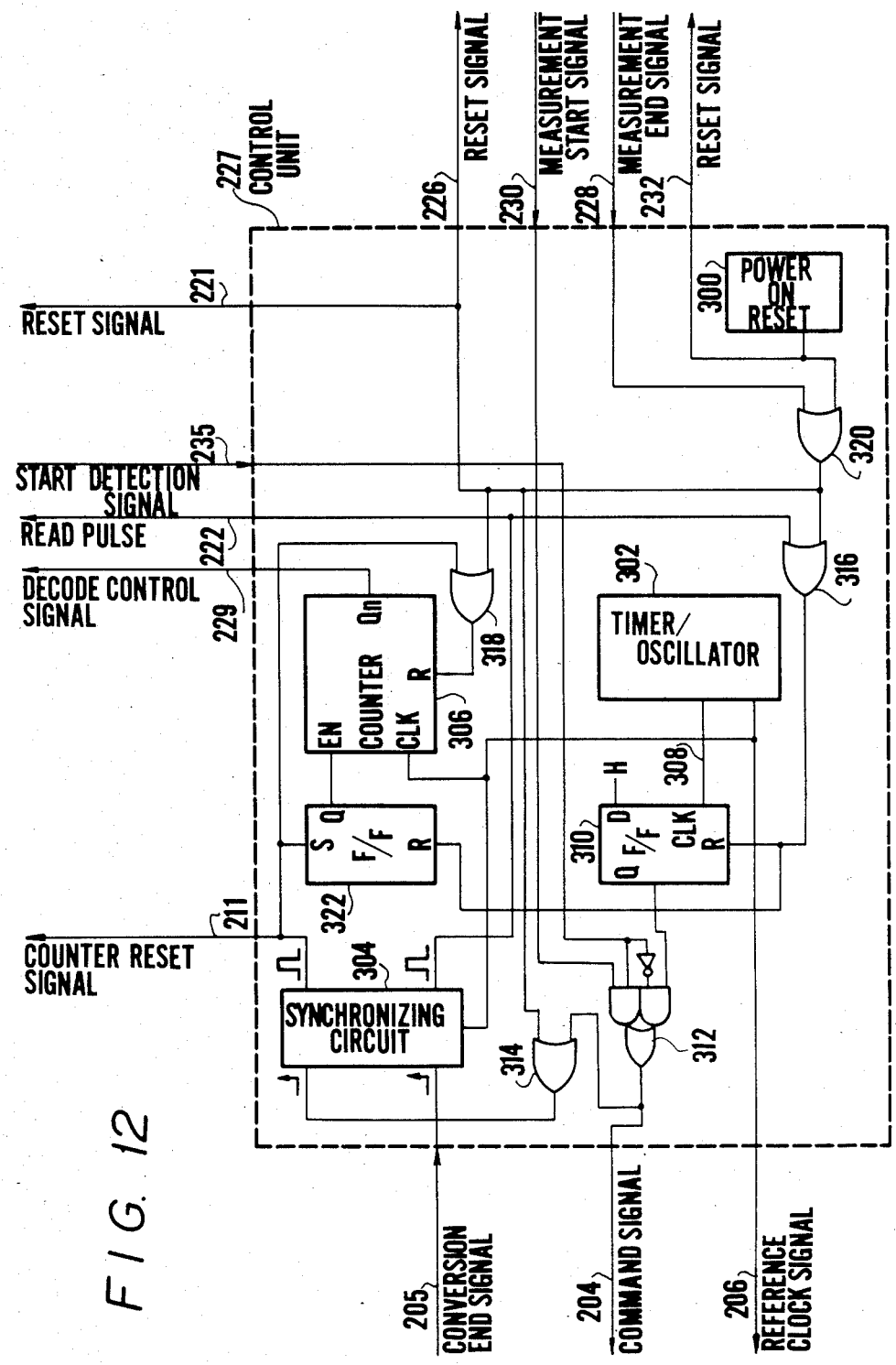
FIG. 12 is a block diagram illustrating the detailed construction of a control unit shown in FIG. 9.

The construction of the control unit 227 is shown in FIG. 12. A power-on reset circuit 300 produces the reset signal 232 when power is introduced to the electronic clinical thermometer of this embodiment from a power supply. Signal 232, as well as being sent to the microcomputer, functions to reset the logic within the control unit 227. A timer/oscillator circuit 302 delivers the reference clock 206 to the converting circuit 202, the clock 206 also being used as a control clock for the logic within the control unit 227. By way of example, the clock 206 is used by a synchronizing circuit 304, comprising a plurality of flip-flops, to produce the pulses 211 synchronized to the clock 206 at the leading edge of its input signal, and is used as a timer counting clock by a counter circuit 306 for producing the decoder control signal 229. The pulse 211 is applied to a flip-flop 322 thereby setting the same and producing the Q output for enabling the counter 306. The counter 306 is reset by the counter reset signal 211, measurement end signal 228 or power on reset signal via an OR gate 318. The oscillator circuit 302 also produces a clock 308.

This serves as a pre-measurement timing clock, set to a period of four seconds, for use in the abovementioned pre-measurement operation of low accuracy. The periods of clocks 206, 308 can be set freely by the microcomputer 231. A pre-measurement flip-flop 310 is triggered by the leading edge of the clock 308 and produces the measurement start signal (command signal) 204 via an OR gate 312. The other input to OR gate 312 is the measurement start detection signal 235 which, similarly, sends the signal 204 to logical "1". An OR gate 314 is provided in order that the reset signal 211 for the counters 207, 306 may be formed in sync with the command signal 204 or reset signal 226. The conversion end signal 205 activates the synchronizing circuit 304 which responds by producing the read pulse 222 and, through an OR gate 316, by resetting corresponding flip-flops 310, 322. Reset signals 221 and 226 are produced by an OR gate 320 in response to the power-on reset signal 232 or the measurement end signal 228 from the microcomputer 231.

The circuit shown in FIG. 9 is constructed using C-MOS technology. At the instant power is introduced to the circuitry, the counter reset signal 211 and flip-flop reset signals 221, 226 are produced to reset the counter and flip-flops. The microcomputer 231, on the other hand, receives a reset signal 232 for initialization, upon which the microcomputer is placed in the stand-by state to suppress power consumption.

Reference will now be had to FIGS. 13A and 13B to describe processing executed by the microcomputer 231 when power is introduced.

Referring first to FIG. 13A, the measurement start signal 230 is set to a low level when power is introduced. Next, the measurement end signal 228 is set to the low level and the registers are cleared, establishing a halted state awaiting an interrupt.

In FIG. 13B, the microcomputer 231 has been started by the interrupt start signal 234 generated every second and produces the measurement start signal 230. Thenceforth the timer is set and the microcomputer awaits for the end of an A/D conversion, i.e, for the conversion of temperature information into digital data. When the time kept by the timer expires, the data output 208 on the data bus is read in, computations and processing are executed on the basis of the data, the predicted temperature is displayed if it is necessary, and so forth. When the body temperature measurement ends, the measurement end signal 228 is produced and the operation of the CPU is suspended.

It should be noted that the functions performed by the processor 154 in the arrangement of FIG. 8 can be expanded so that software can be used to implement the functions of the temperature threshold value sensing circuit 150, temperature change sensing circuit 151 and measurement control circuit 152. Specifically, the function performed by the sensing circuit 150 can be implemented by a processing routine wherein the processor 154 receives the temperature signal 14 and responds by executing steps 101 and 102 at regular, comparatively short intervals. If a "YES" result is obtained in step 102, step 103 will be executed by the processor 154 rather than the temperature change sensing circuit 151, which responds to the signal 160 in FIG. 8. For example, the processor will determine whether $dT/dt \geq k$ holds, where dt is the comparatively short interval mentioned above, and dT is the difference between the temperature T just sampled and a temperature T sampled previously. If the result is "YES" in step 103, then, instead of the signal 161 being produced, the processor will execute a routine for steps 104 through 106. This routine implements the function of the measurement control circuit 152. Since a microcomputer can readily be provided with a timer interrupt function, this can be substituted for the function performed by the clock signal generating circuit 153. In such case the timer interrupt function would be initialized in step 104, and the interrupt generation timing would be set to, say, ten seconds. The process will move to step 119 when the first timer interrupt is generated. For the second timer interrupt onward, the processing path followed will change so that step 121 is executed. Thus, the arithmetic unit 2 for predicting the final temperature can be realized by a microcomputer having a timer interrupt function.

In accordance with the electronic clinical thermometer and method of temperature measurement of the present invention as described and illustrated hereinabove, the results of predicting temperature based on a selected prediction function are evaluated, and the value of the parameter used for the prediction process, namely the prediction function, is corrected in accordance with the evaluated results, the correction being effected by negative feedback. This provides a predicted temperature reading of comparatively good accuracy. Since temperature measurement and the prediction operation continue even while the predicted final temperature is being displayed, the accuracy of the predicted temperature is enhanced statistically with the passage of time. Further, according to the invention, different arithmetic expressions for predicting temperature, as well as different parameters contained by these expressions, can be selected at will. This makes it possible to predict final temperature accurately with the same electronic clinical thermometer regardless of whether body temperature is measured, e.g., orally or by placement of the thermometer in an armpit.

As many apparently widely different embodiments of the present invention can be made without departing from the spirit and scope thereof, it is to be understood that the invention is not limited to the specific embodiments thereof except as defined in the appended claims.

What we claim is:

1. An electronic clinical thermometer for measuring the temperature of a subject, which comprises:
    means for sensing body temperature at a prescribed part of a body of a subject whose temperature is to be measured;
    arithmetic means coupled to said temperature sensing means for predicting a final, stable temperature based on the sensed body temperature at a prescribed body part, said arithmetic means selectively executing a selected temperature prediction function out of a plurality of temperature prediction functions conforming with measurement conditions of the subject whose temperature is to be measured, in which temperature prediction functions elapsed measurement time is a variable, each of said temperature prediction functions prescribing a temperature change up to a final, stable temperature;
    display means coupled to said arithmetic means for displaying the predicted temperature; and
    control means for clocking elapsed measurement time and for controlling said temperature sensing means and said arithmetic means at sampling instants;
    said arithmetic means including:
        (a) first setting means for selectively setting one of said plurality of temperature prediction functions;
        (b) means for obtaining a final, stable temperature at least twice in accordance with a time series, at the sampling instants determined by said control means, based on said set temperature prediction function and body temperature sensed by said temperature sensing means;

(c) means for comparing a final, stable temperature last obtained by said obtaining means with a final, stable temperature obtained at a previous sampling instant, and for obtaining the difference between said two final temperatures;

(d) second setting means for setting a new and different temperature prediction function from said plurality of temperature prediction functions when said difference falls outside prescribed limits to enable said obtaining means to obtain a final, stable temperature at least twice in accordance with said time series based on said new temperature prediction function; and (e) means for supplying said display means with a signal indicative of that final, stable temperature obtained by said obtaining means which results in said difference falling within said prescribed limits.

2. The electronic clinical thermometer according to claim 1, wherein said obtaining means of said arithmetic means includes means for computing a corrective temperature differential, at said sampling instants, between body temperature sensed by said temperature sensing means and a predicted value of a final, stable temperature, said differential being computed from said temperature prediction function; and means for obtaining the final, stable temperature by adding said calculated corrective temperature differential to the sensed body temperature at said sampling instants.

3. The electronic clinical thermometer according to claim 1, wherein $U = \gamma t + \beta + K(t+\gamma)^\delta$ is used as said temperature prediction function, where:

U: corrective temperature differential
t: elapsed measurement time
K: variable parameter indicating extent of temperature rise
$\gamma, \beta, \gamma, \delta$: constants.

4. The electronic clinical thermometer according to claim 1, wherein $U = (aA+b)t + cA + d + K(-t+e)^A + d(t-t_0)/(K+g)$ is used as said temperature prediction function, where:

U: corrective temperature differential
t: elapsed measurement time
A: variable parameter dependent upon part of the body where temperature is being sensed
K: variable parameter indicating extent of temperature rise
a, b, c, d, e, g, g: constants
$t_0$: constant indicating prescribed point in time during course of measurement $(t-t_0)$ being replaced by zero when $t-t_0$ is negative, and by the actual value when $t-t_0$ is non-negative.

5. The electronic clinical therometer according to claim 1, wherein:

said arithmetic means includes means for supplying said display means with a predicted value of said obtained final, stable temperature when said difference lies within said prescribed limits continuously for a predetermined length of time; and said second setting means includes means for setting said new temperature prediction function on which said obtaining means operates when said difference does not lie in said prescirbed limits continuously for said predetermined length of time.

6. The electronic clinical thermometer according to claim 1, wherein the temperature prediction function set by said first setting means is a value having the highest probability of being the proper temperature change, obtained statistically by an actual measurement performed in advance with elapsed measurement time.

7. The electronic clinical thermometer according to claim 1, wherein the temperature prediction function set by said first setting means approaches a final, stable temperature relatively early during elapsed measurement time, and wherein said second setting means selects successively temperature prediction functions approaching a final, stable temperature gradually with elapsed measurement time.

8. The electronic clinical thermometer according to claim 1, wherein said plurality of temperature prediction functions are provided in conformance with measurement prediction conditions for prescribed parts of a body ranging from an armpit to the interior of the mouth, and wherein the temperature prediction function set by said first setting means corresponds to measurement conditions lying between those for an armpit and those for the interior of the mouth.

9. The electronic clinical thermometer according to claim 1, wherein said control means instructs said obtaining means, said comparing means and said second setting means of said arithmetic means to begin operation when said temperature sensing means senses a body temperature above a predetermined value and said sensed body temperature exhibits a rate of increase above a predetermined value.

10. The electronic clinical thermometer according to claim 1, wherein said plurality of temperature prediction functions are provided conforming with measurement of temperature in the region of the armpit of the subject.

11. The electronic clinical thermometer according to claim 1, wherein said plurality of temperature prediction functions are provided conforming with measurement of temperature in the region of the mouth of the subject.

12. The electronic clinical thermometer according to claim 1, wherein said plurality of temperature prediction functions are provided conforming with measurement of temperature in at least two regions of the body of the subject.

13. The electronic clinical thermometer according to claim 12, wherein said two regions are the mouth and the armpit.

14. An electronic clinical thermometer for measuring the temperature of a subject, which comprises:

means for sensing body temperature at a prescribed part of a body of a subject whose temperature is to be measured;

arithmetic means coupled to said temperature sensing means for predicting a final, stable temperature based on the sensed body temperature at a prescribed body part, said arithmetic means selectively executing a selected temperature prediction function out of a plurality of temperature prediction functions conforming with measurement conditions of the subject whose temperature is to be measured, in which temperature prediction functions elapsed measurement time is a variable, each of said temperature prediction functions prescribing a temperature change up to a final, stable temperature;

display means coupled to said arithmetic means for displaying the predicted temperature; and control means for clocking elapsed measurement time and for controlling said temperature sensing means and said arithmetic means at sampling instants;

said arithmetic means including:
- (a) first setting means for selectively setting one of said plurality of temperature prediction functions;
- (b) means for obtaining a final, stable temperature at least twice in accordance with a time series, at the sampling instants determined by said control means, based on said set temperature prediction function and body temperature sensed by said temperature sensing means;
- (c) means for comparing a final, stable temperature last obtained by said obtaining means with a final, stable temperature obtained at a previous sampling instant, and for obtaining the difference between said two final temperatures;
- (d) second setting means for setting a new and different temperature prediction function from said plurality of temperature prediction functions when said difference falls outside prescribed limits to enable said obtaining means to obtain a final, stable temperature at least twice in acordance with said time series based on said new temperature prediction function; and
- (e) means for supplying said display means with a signal indicative of that final, stable temperature obtained by said obtaining means which results in said difference falling within said prescribed limits; and wherein said obtaining means, said comparing means and said second setting means continue to operate to correct the signal supplied to said display means.

15. The electronic clinical thermometer according to claim 14, wherein said display means is supplied with a predicted value of said obtained final, stable temperature, when said difference lies within the prescribed limits continuously for a predetermined length of time, and said display means is not supplied with said predicted value when said difference does not lie in said prescribed limits continuously for the predetermined length of time.

16. The electronic clinical thermometer according to claim 14, wherein said plurality of temperature prediction functions are provided conforming with measurement of temperature in the region of the armpit of the subject.

17. The electronic clinical thermometer according to claim 14, wherein said plurality of temperature prediction functions are provided conforming with measurement of temperature in the region of the mouth of the subject.

18. The electronic clinical thermometer according to claim 14, wherein the plurality of temperature prediction functions are provided conforming with measurement of temperature in at least two regions of the body of the subject.

19. The electronic clinical thermometer according to claim 13, wherein said two regions are the mouth and the armpit.

20. A method of measuring body temperature comprising the steps of:
- (a) setting for execution by arithmetic means one of a plurality of temperature prediction functions conforming with measurement conditions of the subject whose temperature is to be measured, in which functions elapsed measurement time is a variable, each function prescribing a temperature change up to a final, stable temperature;
- (b) clocking elapsed measurement time and reading in a sensed body temperature at a body part at a specific point in time;
- (c) predicting a final, stable temperature by repeating, at least twice in accordance with a time series, a process for obtaining a stable, final temperature based on said read body temperature at said same body part and said temperature prediction function at said point in time;
- (d) comparing the final, stable temperatures at two points in said time series and determining a difference between said final temperatures;
- (e) altering the temperature prediction function by setting another temperature prediction function of said plurality when said difference falls outside prescribed limits, and executing said steps (c) and (d); and
- (f) outputting said final, stable temperature to output means as a measured temperature when said difference falls within said prescribed limits.

* * * * *

UNITED STATES PATENT AND TRADEMARK OFFICE
CERTIFICATE OF CORRECTION

PATENT NO. : 4,629,336
DATED : December 16, 1986
INVENTOR(S) : ISHIZAKA

It is certified that error appears in the above-identified patent and that said Letters Patent is hereby corrected as shown below:

Column 17, line 12, "1" should be -- 0 --

Column 24, claim 19, line 2, "claim 13" should be -- claim 18 --

Signed and Sealed this

Thirty-first Day of May, 1988

Attest:

DONALD J. QUIGG

Attesting Officer

Commissioner of Patents and Trademarks